(12) United States Patent
Hernacki et al.

(10) Patent No.: US 8,131,846 B1
(45) Date of Patent: Mar. 6, 2012

(54) GLOBAL, LOCATION-AWARE COMPUTER SECURITY

(75) Inventors: Brian Hernacki, Mountain View, CA (US); William E. Sobel, Jamul, CA (US)

(73) Assignee: Symantec Corporation, Mountain View, CA (US)

( * ) Notice: Subject to any disclaimer, the term of this patent is extended or adjusted under 35 U.S.C. 154(b) by 111 days.

(21) Appl. No.: 12/498,288

(22) Filed: Jul. 6, 2009

(51) Int. Cl.
*G06F 15/173* (2006.01)

(52) U.S. Cl. ........................... 709/224; 709/219

(58) Field of Classification Search .................... 709/224
See application file for complete search history.

(56) References Cited

U.S. PATENT DOCUMENTS

| | | | |
|---|---|---|---|
| 6,922,567 B1 * | 7/2005 | Rydbeck | 455/456.3 |
| 7,496,960 B1 * | 2/2009 | Chen et al. | 726/22 |
| 7,516,476 B1 * | 4/2009 | Kraemer et al. | 726/1 |
| 7,530,106 B1 * | 5/2009 | Zaitsev et al. | 726/24 |
| 7,567,810 B1 * | 7/2009 | Overton | 455/456.3 |
| 7,712,132 B1 * | 5/2010 | Ogilvie | 726/22 |
| 2003/0177389 A1 * | 9/2003 | Albert et al. | 713/201 |
| 2006/0014547 A1 * | 1/2006 | Walter | 455/456.1 |
| 2006/0070130 A1 * | 3/2006 | Costea et al. | 726/24 |
| 2007/0186284 A1 * | 8/2007 | McConnell | 726/25 |

OTHER PUBLICATIONS

Cheng et al. "SmartSiren: Virus Detection and Alert for Smartphones." MobiSys '07: Proceedings of the 5th international conference on Mobile systems, applications and services. ACM, New York, NY, USA: 2007. pp. 258-271.*

* cited by examiner

*Primary Examiner* — Christopher Biagini
(74) *Attorney, Agent, or Firm* — Brill Law Office; Jeffrey Brill

(57) ABSTRACT

Global, location-aware security information is generated, and used to provide location-aware computer security to portable computing devices. A global, location-aware security system receives local, location-aware security information from a large number of portable devices. The local information from each device comprises their locations at the times of detection of threat indicators. The global system transforms the received local information into global information, and maps detected threat indicators to specific locations. Each device monitors activity occurring thereon, detects threat indicators and current locations, and builds local information, which is periodically transmitted to the global system. When a device is activated or moved to a new location, it determines its current location, and requests global information concerning that location from the global system. The global system transmits global information, which the portable device uses to apply a location-based risk level policy to provide location-aware computer security.

19 Claims, 6 Drawing Sheets

GLOBAL, LOCATION-AWARE COMPUTER SECURITY

TECHNICAL FIELD

This disclosure pertains generally to computer security, and more specifically to generating global, location-aware security information, and using the generated, global, location-aware security information to provide location-aware computer security to portable computing devices.

BACKGROUND

Location-aware computer security exists today. For example, a portable computing device such as a laptop computer or personal digital assistant may be configured to utilize stronger security settings in public places than in specific trusted environments, such as at work or at home. Such location-aware computer security is implemented by manually administering the computing devices to apply specific security settings in specific contexts. For example, a security system on a portable device can be configured by a system administrator to employ one set of security parameters when the computing device is physically located at the owner's work place, another set at the owner's home, and a third, default set when the device is located anywhere other than those two locations. The security system can determine whether the portable computing device is in a specific, known location via, e.g., Global Positioning System (GPS) coordinates or a WiFi access point MAC address.

Such location aware security systems require manual configuration of individual portable computing devices for individual physical locations. Such systems cannot be readily scaled to cover large numbers of users, because each user's security settings must be manually configured to cover the known locations frequented by that user. Furthermore, such systems have no automated mechanism for adding coverage for new physical locations. For example, while an individual user could manually configure his laptop to recognize his home and work locations and configure a security policy for each, the system would still lack security policies for all locations that have not been manually configured. Such security systems also have high administrative overhead, and do not automatically remain current. For example, if a user changes offices, employers or residences, the system needs to be manually reconfigured to account for these changes. It is therefore not uncommon for the location based data in such systems to become out of date. It would be desirable to address these issues.

SUMMARY

Global, location-aware security information is generated, and used to provide location-aware computer security to portable computing devices. A centrally located global, location-aware security system receives local, location-aware security information from a large number of portable computing devices. The local, location-aware security information from each portable computing device comprises information concerning detected threat indicators, and the locations of the portable computing devices at the times of detection. In some embodiments, the global, location-aware security system validates and/or authenticates some or all portable computing devices from which local, location-aware security information originates. The global, location-aware security system can also optionally validate and/or authenticate received local, location-aware security information. In some embodiments, the global, location-aware security system load balances local, location-aware security information as it is received from the plurality of portable computing devices.

The global, location-aware security system transforms the received local, location-aware security information from the plurality of portable computing devices into a data set of global, location-aware security information. In some embodiments, this transformation further comprises weighting local, location-aware security information originating from different portable computing devices. The global, location-aware security system also uses the global data set to map threat indicators in the global, location-aware security information to specific locations. The global, location-aware security system adds the resulting threat indicator mappings to the global, location-aware security information.

On the portable computing device side, a local portable device agent monitors activity occurring thereon, such as network traffic to and from the portable computing device, connections on the portable computing device and the user's activity on the portable computing device. In some embodiments, the portable device agent omits the monitoring of some activity occurring on the portable computing device for privacy reasons. The portable device agent detects threat indicators on the portable computing device, based on the activity monitoring. When a threat indicator is detected, the portable device agent determines the current location of the portable computing device. The portable device agent builds local, location-aware security information, which comprises at least information concerning the detected threat indicator and the current location of the portable computing device at the time the threat indicator is detected. In some embodiments, the portable device agent classifies detected threat indicators, based upon the type of potential threat indicated and/or rates detected threat indicators, based upon their potential severity. In such embodiments, the local, location-aware security information further comprises this classification and/or rating information. In any case, the portable device agent periodically transmits the local, location-aware security information to the global, location-aware security system (this transmission can occur, for example, in real-time as threat indicators are detected, or at periodic intervals).

When a portable computing device is activated or moved to a new location, the portable device agent determines the current, physical location of the portable computing device. The portable device agent transmits a request for global, location-aware security information concerning that location to the global, location-aware security system. The global, location-aware security system receives the request from the portable computing device, and responds by transmitting global, location-aware security information concerning the specific location to the portable computing device, such that the portable computing device can apply an appropriate location-based risk level policy. In some embodiments, this comprises transmitting raw, global location-aware security information to the portable security device. In other embodiments, the global, location-aware security system creates a location-based risk level policy for the location, and transmits this created, location-based risk level policy to the portable computing device.

The portable device agent receives the transmitted global, location-aware security information concerning its current location from the global, location aware security system. As noted above, this global, location-aware security information can comprise a location-based risk level policy for use within the location, or raw, global, location-aware security information concerning the current location. In the later case, the portable device agent creates a location-based risk level policy for the current location, based on the received, raw global location-aware security information. In either case, the portable device agent applies the location-based risk level policy for the current location to the portable computing device, thereby using the received global, location-aware security information to provide location-aware computer security to the portable computing device.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the subject matter, resort to the claims being necessary to determine such subject matter.

The Figures depict various embodiments for purposes of illustration only. One skilled in the art will readily recognize from the following discussion that other embodiments of the structures and methods illustrated herein may be employed without departing from the described principles.

DETAILED DESCRIPTION

Figure 1:
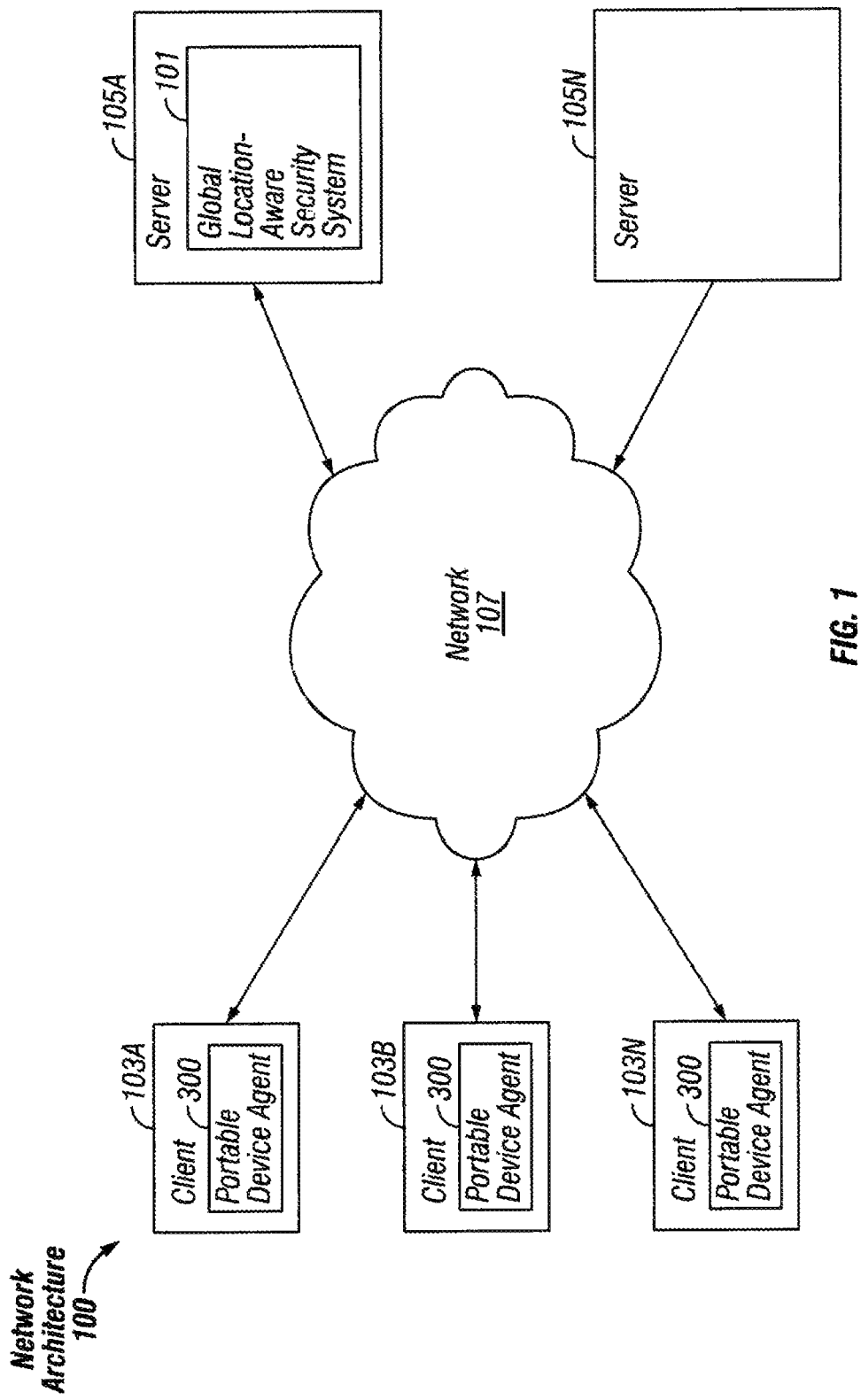
FIG. 1 is a block diagram of an exemplary network architecture in which a global, location-aware security system can be implemented, according to some embodiments.

FIG. 1 is a block diagram illustrating an exemplary network architecture 100 in which a global, location-aware security system 101 can be implemented. The illustrated network architecture 100 comprises multiple clients 103A, 103B and 103N, as well as multiple servers 105A and 105N. In FIG. 1, the global, location-aware security system 101 is illustrated as residing on server 105A. It is to be understood that this is an example only, and in various embodiments this system 101 can be instantiated on a server 105, a client 103 or distributed between multiple servers 105 and/or clients 103. In FIG. 1, a portable device agent 109 is illustrated as residing on each client 103A, 103B and 103N. Portable device agents 109 are discussed in greater detail below.

Clients 103 and servers 105 can be implemented using computer systems 210 such as the one illustrated in FIG. 2 and described below. The clients 103 and servers 105 are communicatively coupled to a network 107, for example via a network interface 248 or modem 247 as described below in conjunction with FIG. 2. Clients 103 are able to access applications and/or data on servers 105 using, for example, a web browser or other client software (not shown).

Although FIG. 1 illustrates three clients and two servers as an example, in practice many more (or fewer) clients 103 and/or servers 105 can be deployed. In one embodiment, the network 107 is in the form of the Internet. Other networks 107 or network-based environments can be used in other embodiments.

Figure 2:
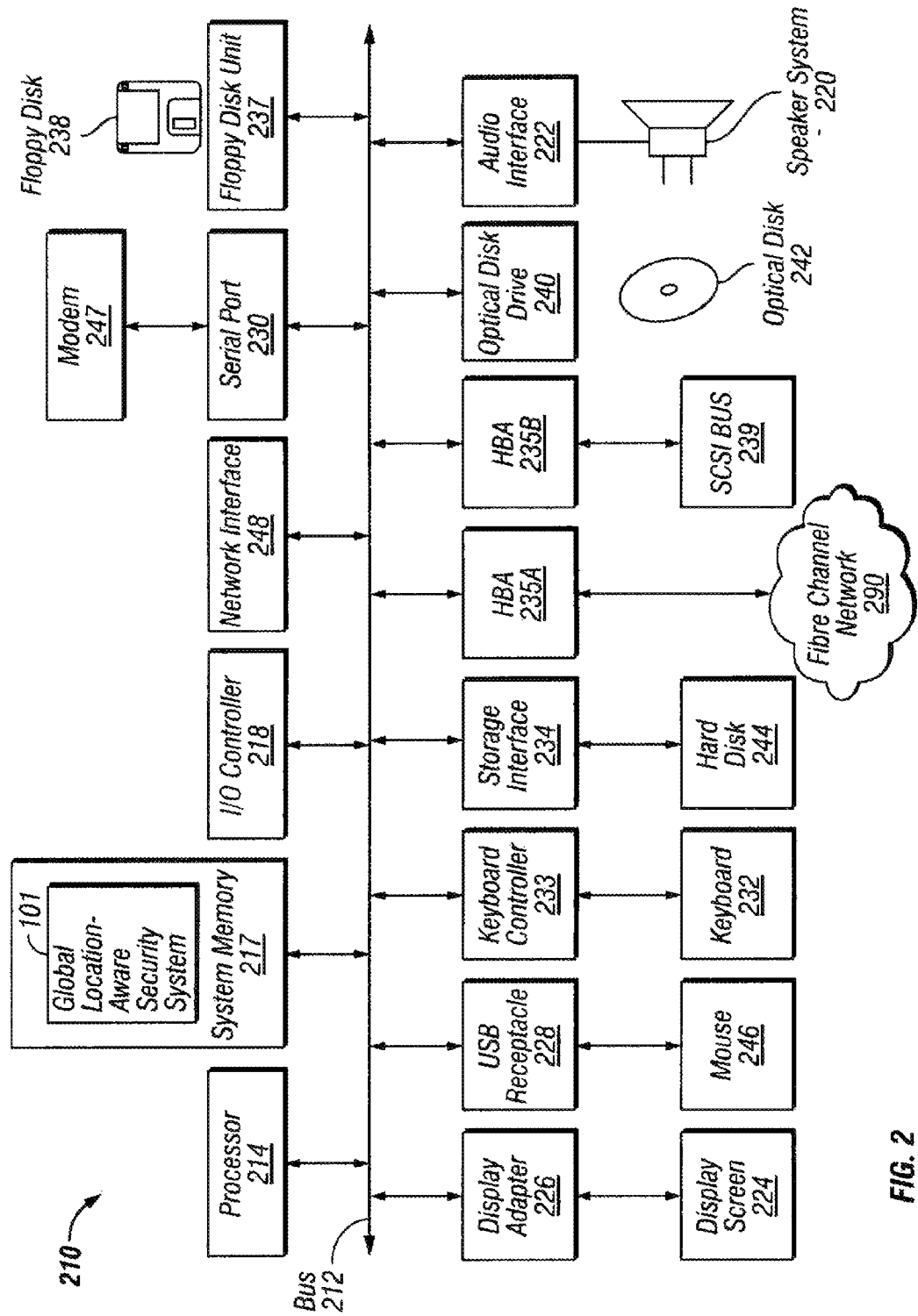
FIG. 2 is a block diagram of a computer system suitable for implementing components of a global, location-aware security system, according to some embodiments.

FIG. 2 is a block diagram of a computer system 210 suitable for implementing a global, location-aware security system 101 or a portable device agent 109. Both clients 103 and servers 105 can be implemented in the form of such computer systems 210. Particularly in the case of clients 103, the computer system 210 can be in the form of a portable computing device 300. As described in greater detail below in conjunction with FIG. 3, a portable computing device 300 is a type of computer system 210. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory), an input/output (I/O) controller 218, an audio output interface 222 communicatively coupled to an external audio device such as a speaker system 220, a display adapter 226 communicatively coupled to an external video output device such as a display screen 224, one or more interfaces such as serial ports 230, Universal Serial Bus (USB) receptacles 230, parallel ports (not illustrated), etc., a keyboard controller 233 communicatively coupled to a keyboard 232, a storage interface 234 communicatively coupled to at least one hard disk 244 (or other form(s) of magnetic media), a floppy disk drive 237 configured to receive a floppy disk 238, a host bus adapter (HBA) interface card 235A configured to connect with a Fibre Channel (FC) network 290, an HBA interface card 235B configured to connect to a SCSI bus 239, an optical disk drive 240 configured to receive an optical disk 242, a mouse 246 (or other pointing device) coupled to the bus 212, e.g., via a USB receptacle 228, a modem 247 coupled to bus 212, e.g., via a serial port 230, and a network interface 248 coupled, e.g., directly to bus 212.

Other components (not illustrated) may be connected in a similar manner (e.g., document scanners, digital cameras, printers, etc.). Conversely, all of the components illustrated in FIG. 2 need not be present. Furthermore, the components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, optical disk 242) and loaded into system memory 217 and executed by the processor 214. Application programs can also be loaded into system memory 217 from a remote location (i.e., a remotely located computer system 210), for example via the network interface 248 or modem 247. In FIG. 2, the global, location-aware security system 101 is illustrated as residing in system memory 217. The workings of the global, location-aware security system 101 are explained in greater detail below in conjunction with FIG. 3. It is to be understood that a portable device agent 109 can also reside in system memory 217 of a computer system 210, although this is not specifically illustrated in FIG. 2.

The storage interface 234 is coupled to one or more hard disks 244 (and/or other standard storage media). The hard disk(s) 244 may be a part of the computer system 210, or may be physically separate and accessed through other interface systems.

The network interface 248 and or modem 247 can be directly or indirectly communicatively coupled to a network 107 such as the Internet. Such coupling can be wired or wireless.

Figure 3:
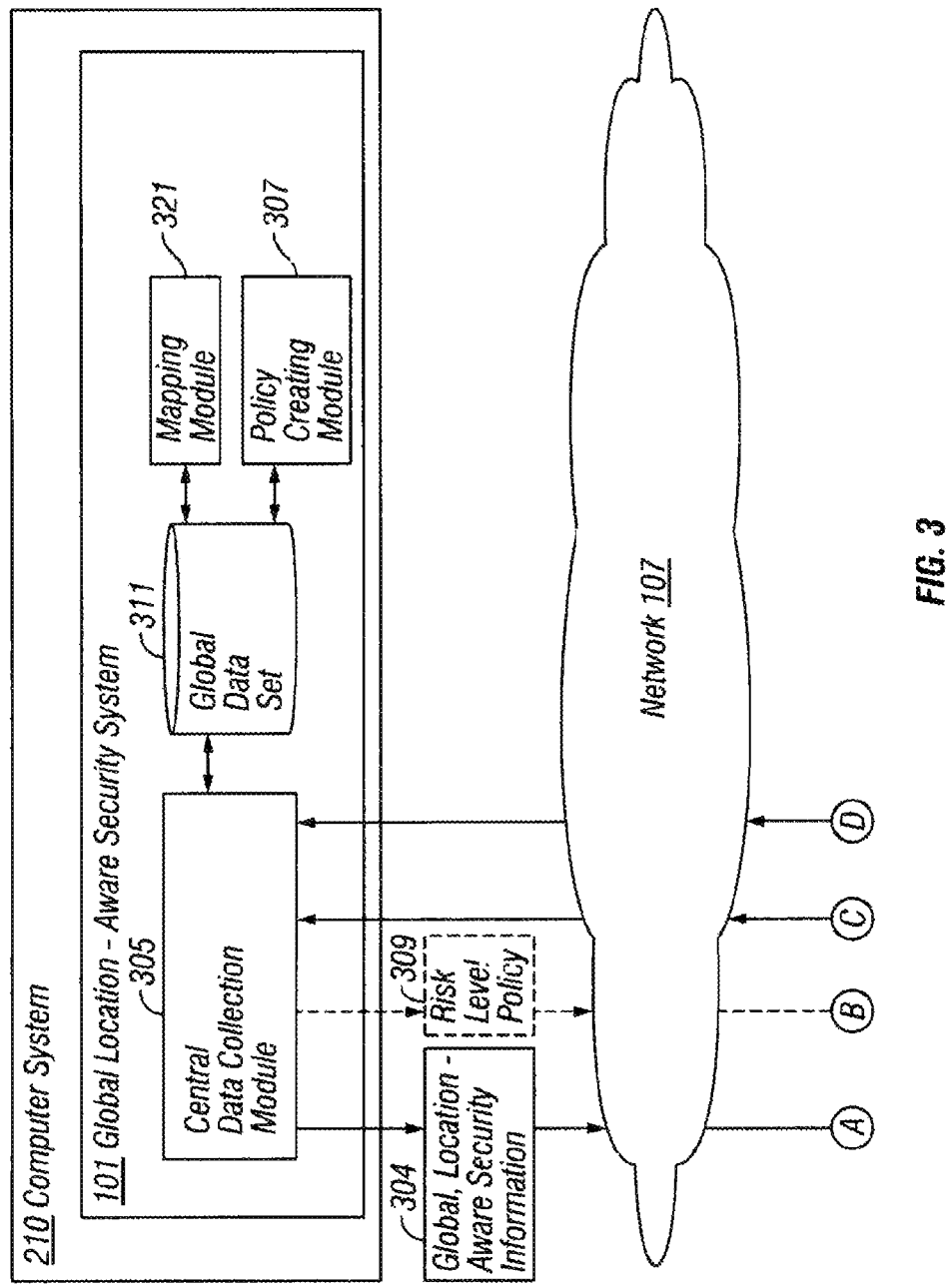
FIG. 3 is a block diagram of a global, location-aware security system, according to some embodiments.
Figure 3:
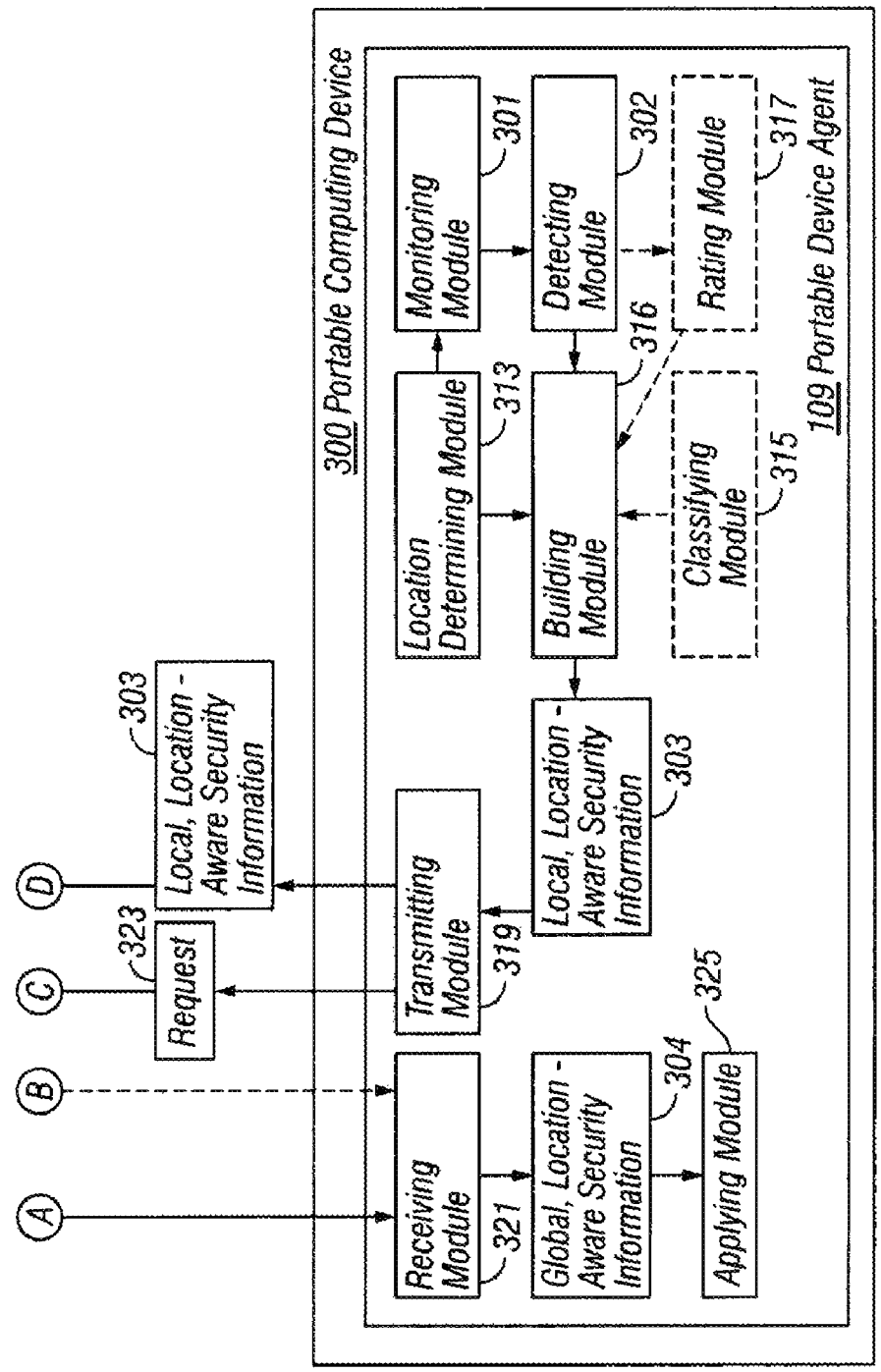

FIG. 3 illustrates a global, location-aware security system 101, according to some embodiments. This global, location-aware security system 101 is illustrated as residing on a computer system 210, which as described above can comprise a server 105 or a client 103. As illustrated in FIG. 3, a portable device agent 109 resides on a portable computing device 300. It is to be understood that in practice a large number of portable computing devices 300 are deployed, each with its own portable device agent 109. In some embodiments, the functionality of the global, location-aware security system 101 and/or portable device agent 109 is distributed between multiple computer systems 210, and/or provided as a service over a network 107 in a cloud based computing environment.

It is to be understood that although modules of the global, location-aware security system 101 and the portable device agent 109 are both illustrated in FIG. 3 as separate entities, the illustrated global, location-aware security system 101 and portable device agent 109 each represent a collection of functionalities, which can be instantiated as fewer, more or overlapping modules as desired. It is to be understood that the modules of the global, location-aware security system 101 and the modules of the portable device agent 109 can be instantiated (for example as object code or executable images) within the system memory 217 (e.g., RAM, ROM, flash memory) of a computer system 210, such that when the processor 214 of the computer system 210 processes a module, the computer system 210 executes the associated functionality. Additionally, program code to implement the functionalities of the global, location-aware security system 101 and/or the portable device agent 109 can be stored on computer-readable storage media, such that the program code can be loaded from the computer-readable storage media into the system memory 217 of a computer system 210, and executed by the processor 214 of the computer system 210. Any form of tangible computer readable storage medium can be used in this context, such as magnetic or optical storage media. As used herein, the term "computer readable storage medium" does not mean an electrical signal separate from an underlying physical medium.

As used herein, the terms "computer system," "computer," "client," "client computer," "server," "server computer" and "computing device" mean one or more computers configured and/or programmed to execute the described functionality. As used herein the term "portable computing device" means a computer system 210 that can be practicably moved between and used in different physical locations. Examples of portable computing devices 300 include but are not limited to laptop computers, personal digital assistants, smart-phones, etc.

As illustrated in FIG. 3, the portable device agent 109 includes a monitoring module 301, which, as described in detail below, transmits local, location-aware security information 303 to a centralized, global, location-aware security system 101. Thus, the global, location-aware security system 101 receives local, location-aware security information 303 from a large set of portable computing devices 300. Only a single portable computing device 300 is depicted in FIG. 3 for clarity of illustration.

As illustrated in FIG. 3, one component of the global, location-aware security system 101 is a central data collection module 305. The central data collection module 305 uses functionality similar to that of a conventional, non location-aware, large data management system, such as a reputation or risk assessment system. The central data collection module 305 is configured to receive large amounts of data from a very large set of clients 103 (in this case, to receive local, location-aware security information 303 from monitoring modules 301 on a large number of portable computing devices 300). The central data collection module 305 can execute conventional central data collection functionality, such as validation, authentication, load balancing, fraud prevention, etc. The data collection module 305 can accept authenticated submissions of local, location-aware security information 303 from validated endpoints (monitoring modules 301/portable computing devices 300). The central data collection module 305 incorporates this received local, location-aware security information 303 into a data set 311 of global, location-aware security information 304. In other words, the central data collection module 305 receives local, location-aware security information 303 from a large number of participating portable computing devices 300, and transforms it into a data set 311 of global, location-aware security information 304.

In some embodiments, not all monitoring modules 301/portable computing devices 300 are treated equally. For example, given endpoints may be more or less trusted based on factors such as platform, user, past performance, location, etc. In such embodiments the data set 311 can also store metadata (not illustrated) concerning such factors as validation, weighting, etc. Those of ordinary skill in the relevant art are familiar with protocols for central data collection functionality, such as authentication, validation, weighting, load balancing, fraud prevention, and the like. The implementation details of applying such functionality within the context of various embodiments will be readily apparent to those of such a skill level in light of this disclosure.

The portable device agent 109 on the portable computing device 300 is communicatively coupled to both a location determining module 313 and a network interface 248. The location determining module 313 determines current location information, and provides the current location information to the portable device agent 109. In various embodiments, the location determining module 313 can use any of a variety of conventional techniques for determining current location information, from, for example, a GPS device, a cellular tower, a service such as skyhook, etc.

The monitoring module 301 of the portable device agent 109 monitors activity occurring on the portable computing device 300 for a variety of threat indicators (e.g., actions indicating a possible security concern). For example, the monitoring module 301 can monitor network traffic to and from the portable computing device 300 for threat indicators. The monitoring module 301 can also monitor connections (e.g., IP probes, BT connections, WiFi, etc.) on the portable computing device 300. User activity (e.g., web browsing, p2p connections, etc.) can be monitored for threat indicators as well. Responsive to the above-described monitoring, a detecting module 302 detects threat indicators. When a threat indicator is detected, the location determining module 313 determines current location information, which is noted by the monitoring module 301. In other words, the monitoring module 301 tracks the current location of the portable computing device 300 at the times threat indicators are detected.

It is to be understood that what specifically comprises a threat indicator is a variable design parameter. Those of ordinary skill in the relevant art are familiar with protocols for monitoring network traffic, device connections and user activity, as well as with the protocols for detecting actions on a computer that indicate possible security concerns. The implementation details of applying such functionality within the context of various embodiments will be readily apparent to those of such a skill level in light of this disclosure.

To address privacy concerns, in some embodiments the monitoring module 301 can be configured to not monitor specific types of user activity, activity at specific locations and/or specific types of data. In other words, some embodiments allow users to configure the monitoring module 301 to support blackout zones, privacy filters, etc. What specifically to monitor, and to what extent to allow users to direct and/or override the monitoring process (if at all) are variable design parameters.

A classifying module 315 of the portable device agent 109 classifies detected threat indicators, based upon the type of potential threat indicated (e.g., phishing attack, man in the middle attack, sniffing for authentication information, etc.). A rating module 317 of the portable device agent 109 rates detected threat indicators, based upon their potential severity (e.g., information gathering cookies are typically considered to present less of a risk than a phishing attack). Those of ordinary skill in the relevant art are familiar with protocols for classifying and ranking computer based actions that indicate possible security concerns, and the implementation details of applying such functionality within the context of various embodiments will be readily apparent to those of such a skill level in light of this disclosure.

A building module 316 on the portable computing device 300 builds local, location-aware security information 303. This local, location-aware security information 303 can comprise detected threat indicators, the current location of the portable computing device 300 at the time specific detected threat indicators are detected, the source of the location information (e.g., GPS device, cell tower, skyhook, etc.), the classification of detected threat indicators and the ranking of detected threat indicators. It is to be understood that the specific format of the local, location-aware security information 303 is a variable design parameter. In some embodiments, the local, location-aware security information 303 can include more or less data as desired.

A transmitting module 319 of the portable device agent 109 periodically transmits the local, location-aware security information 303 to the global, location-aware security system 101. The transmitting module 319 can execute these transmissions in real-time as threat indicators are detected, at periodic intervals, etc. Where transmissions are made at periodic intervals, the specific interval to use is a variable design parameter.

Because the global, location-aware security system 101 receives local, location-aware security information 303 from a large set of portable computing devices 300, over time the global, location-aware security system 101 builds a large data set 311 of global, location-aware security information 304. A mapping module 321 of the global, location-aware security system 101 uses this data set 311 to determine how specific reported threat indicators map to given locations. For example, if an indicator of a particular phishing threat is reported only by portable computing devices 300 in one location, the mapping module 321 maps that threat indicator to that location. On the other hand, if a different threat is reported with approximately equal frequency by portable computing devices 300 at all or many locations, that threat is not mapped to any specific location. Even where a given threat indicator is reported from a variety of locations, the mapping module 321 can often map that threat to one or more specific locations, provided that there is a variance or other pattern between the locations from which the threat is and is not reported (e.g., threat reported only from 20 different locations; threat reported from thousands of locations, but 95% of reports from just three, etc.). The mapping module 321 adds the mapping of threat indicators to specific locations to the global, location-aware security information 304. It is to be understood that the exact mapping criteria to use is a variable design parameter.

It is to be understood that many threats may require proximity to a target in order to be executed. For example, attacks over short range wireless mediums such as WiFi and Bluetooth are highly spatial in nature. Threats like fraud and phishing may also be enabled by proximity (e.g., man in the middle attacks taking advantage of a security compromise in a local network). Additionally, some threats specifically target users in a certain location (e.g., sniffing for authentication information at a specific event or venue). Thus, the mapping of threats to locations on a global scale can be utilized to provide an enhanced level of location-aware security.

When a portable computing device 300 is activated (e.g., is powered-up, enters active mode, exits hibernation mode, etc.) or enters a new location (e.g., a user has his smart-phone in his pocket, and he leaves his office), the location determining module 313 on the portable computing device 300 determines the current location. The transmitting module 319 transmits a request 323 for global, location-aware security information 304 concerning the location to the global, location-aware security system 101. The global, location-aware security system 101 responds by transmitting global, location-aware security information 304 concerning that location to a receiving module 327 on the portable computing device 300, such that an appropriate location-based risk level policy 309 for the location can be applied. In some embodiments the global, location-aware security system 101 transmits raw, global location-aware security information 304 which the portable security device 300 uses to create and apply a location-based risk level policy 309 for the location, as described below. In other embodiments, the global, location-aware security system 101 transmits an actual, location-based risk level policy 309 for the location, which an applying module 325 on the portable computing device applies. Raw, global, location-aware security information 304 and/or risk level policies 309 transmitted to specific portable computing devices 300 may be tailored to the specific device, user and/or location, as desired. In some cases, risk level policies 309 for certain locations (e.g., a user's home or office) can be manually configured for that location (e.g., by the user or a system administrator and added to the global data set 311). Default risk level policies 309 can also be used, for example where no or inadequate global, location-aware security information 304 exists for a given location (e.g., use medium level security settings).

In FIG. 3, a policy creating module 307 is illustrated as being a component of global, location-aware security system 101. It is to be understood that in other embodiments some or all of the functionality of the policy creating module 307 can be distributed to the portable computing devices 300. In embodiments in which policy creating modules 307 are located on portable computing devices 300, the policy creating modules 307 can create location-based risk level policies 309 for those portable computing devices 300 based on raw, global, location-aware security information 304 received from the global, location-aware security system 101. In embodiments in which the policy creating module 307 is centrally located, it creates location-based risk level policies 309 and transmits them to portable computing devices 300. Regardless, the policy creating module(s) 307 create(s) location-based risk level policies 309, based on the data set 311 of global, location-aware security information 304. (As noted above, risk level policies 309 can also be manually configured and included in the data set 311.) A location-based risk level policy 309 comprises a set of rules specifying what actions to apply at a given location, typically based on collected data concerning that location in the data set 311. Those of ordinary skill in the relevant art are familiar with protocols for setting policies determining actions (e.g., changing firewall rules, increasing inspection levels, shutting down network interfaces, etc.) to take responsive to specific levels of risk associated with computer security concerns. The implementation details of applying such functionality within the context of various embodiments will be readily apparent to those of such a skill level in light of this disclosure. It is to be understood that location-based risk level policies 309 can include actions based on spatial information such as "turn off IP services while in location X." Such a policy could direct a portable computing device 300 to continue to monitor its current location until it is moved outside of X, and then re-enable IP services.

Figure 4:
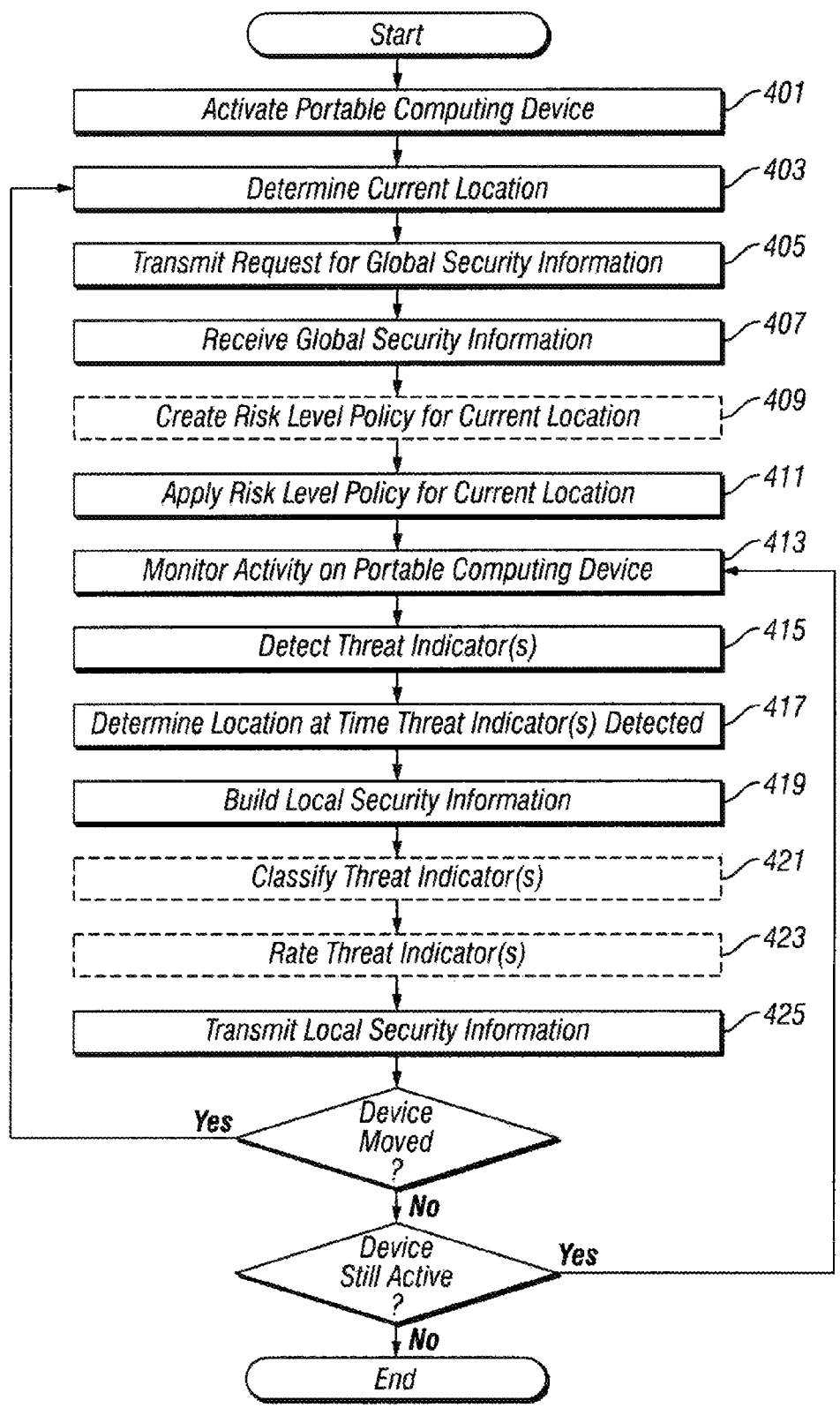
FIG. 4 is a flowchart illustrating steps for a specific example of using global, location-aware security information to provide location-aware computer security to a portable computing device, according to some embodiments.

FIG. 4 illustrates steps for a specific example of using global, location-aware security information 304 (FIG. 3) to provide location-aware computer security to a portable computing device 300 (FIG. 3). As illustrated in FIG. 4, suppose that a given user activates 401 his smart-phone, a type of portable computing device 300 (FIG. 3), at his office (a first location). The location determining module 313 (FIG. 3) determines 403 the current, physical location of the smart-phone 300 (FIG. 3). The transmitting module 319 (FIG. 3) transmits 405 a request 323 (FIG. 3) for global, location-aware security information 304 (FIG. 3) concerning the location to the global, location-aware security system 101 (FIG. 1). The receiving module 327 (FIG. 3) on the smart-phone 300 (FIG. 3) receives 407 global, location-aware security information 304 (FIG. 3) concerning the location from the global, location aware security system 101 (FIG. 1). In this case, the user is located at work, and the received, global, location-aware security information 304 (FIG. 3) comprises a location-based risk level policy 309 (FIG. 3) for use within his place of employment, manually configured by a company systems administrator. In other instances, the received, global, location-aware security information 304 (FIG. 3) can comprise raw, global, location-aware security information 304 (FIG. 3) concerning the current location. In these cases, a policy creating module 307 (FIG. 3) on the smart-phone 300 (FIG. 3) creates 409 a location-based risk level policy 309 (FIG. 3) for the current location, based on the received global location-aware security information 304 (FIG. 3). In either case, the applying module 325 (FIG. 3) applies 411 the location-based risk level policy 309 (FIG. 3) for the current location to the smart-phone 300 (FIG. 3), thereby using the received global, location-aware security information 304 (FIG. 3) to provide location-aware computer security to the smart-phone 300 (FIG. 3).

The monitoring module 301 (FIG. 3) on the smart-phone 300 (FIG. 3) monitors 413 activity occurring thereon, such as network traffic to and from the smart-phone 300 (FIG. 3), connections on the smart-phone 300 (FIG. 3) and the user's activity on the smart-phone 300 (FIG. 3). In some embodiments, the monitoring module 301 (FIG. 3) omits the monitoring of some activity occurring on the smart-phone 300 (FIG. 3) for privacy reasons. The detecting module 302 (FIG. 3) detects 415 threat indicators on the smart-phone 300 (FIG. 3), based on the activity monitoring. When a threat indicator is detected 415, the location determining module 313 (FIG. 3) determines 417 the current location of the smart-phone 300 (FIG. 3) at the time of detection. The building module 316 builds 419 local, location-aware security information 403, which comprises at least information concerning the detected threat indicator and the current location of the smart-phone 300 (FIG. 3) at the time the threat indicator was detected 405. In some embodiments, a classifying module 315 (FIG. 3) classifies 421 detected threat indicators, based upon the type of potential threat indicated. In such embodiments, the local, location-aware security information 403 further comprises this classification information. In some embodiments, a rating module 317 (FIG. 3) rates 423 detected threat indicators, based upon their potential severity. In these embodiments, the local, location-aware security information 403 further comprises this rating information. In any case, the transmitting module 319 (FIG. 3) periodically transmits 425 the local, location-aware security information 303 (FIG. 3) to the global, location-aware security system 101 (FIG. 1) (this transmission can occur, for example, in real-time as threat indicators are detected, or at periodic intervals).

Suppose that the user leaves his office, and walks several blocks to a coffee shop, taking the smart-phone 300 (FIG. 3) with him. The location determining module 313 (FIG. 3) determines 403 the current location of the smart-phone 300 (FIG. 3), indicating that the smart-phone has moved from a first location (the office) to a new location (a point along the route to the coffee shop). The transmitting module 319 (FIG. 3) transmits 405 a request 323 (FIG. 3) for global, location-aware security information 304 (FIG. 3) concerning the new location to the global, location-aware security system 101 (FIG. 1). The receiving module 327 (FIG. 3) on the smart-phone 300 (FIG. 3) receives 407 global, location-aware security information 304 (FIG. 3) concerning the new location from the global, location aware security system 101 (FIG. 1). In this case, the received global information 304 (FIG. 3) indicates nothing specific about the route (i.e., the global, location-aware security system 101 (FIG. 1) does not have any specific, global information 304 (FIG. 3) concerning this location). Therefore, the applying module 325 (FIG. 3) applies 411 a default risk level policy 309 (FIG. 3) for a "reasonably secure" location.

At this point, the user enters the coffee shop, and the location determining module 313 (FIG. 3) determines 403 the new location of the smart-phone 300 (FIG. 3). The transmitting module 319 (FIG. 3) again transmits 405 a request 323 (FIG. 3) for global, location-aware security information 304 (FIG. 3) concerning the new location (the coffee shop) to the global, location-aware security system 101 (FIG. 1). This time, the global, location-aware security system 101 (FIG. 1) has specific, global, location-aware security information 304 (FIG. 3) concerning the coffee shop, based on local, location-aware security information 303 (FIG. 3) concerning this location previously reported by other users. Depending on the embodiment, the receiving module 327 (FIG. 3) may receive 407 a detailed, location-based risk level policy 309 (FIG. 3) or raw, global, location-aware security information 304 (FIG. 3) which the policy creating module 307 (FIG. 3) on the smart-phone 300 (FIG. 3) can use to create 409 a location-based risk level policy 309 (FIG. 3). In either case, the applying module 325 (FIG. 3) applies 411 the location-based risk level policy 309 (FIG. 3) for the coffee shop, which (in this example) indicates to turn off Bluetooth and not allow any incoming connections to the smart-phone 300 (FIG. 3), in order to protect against specific types of attacks previously detected at this location.

Figure 5:
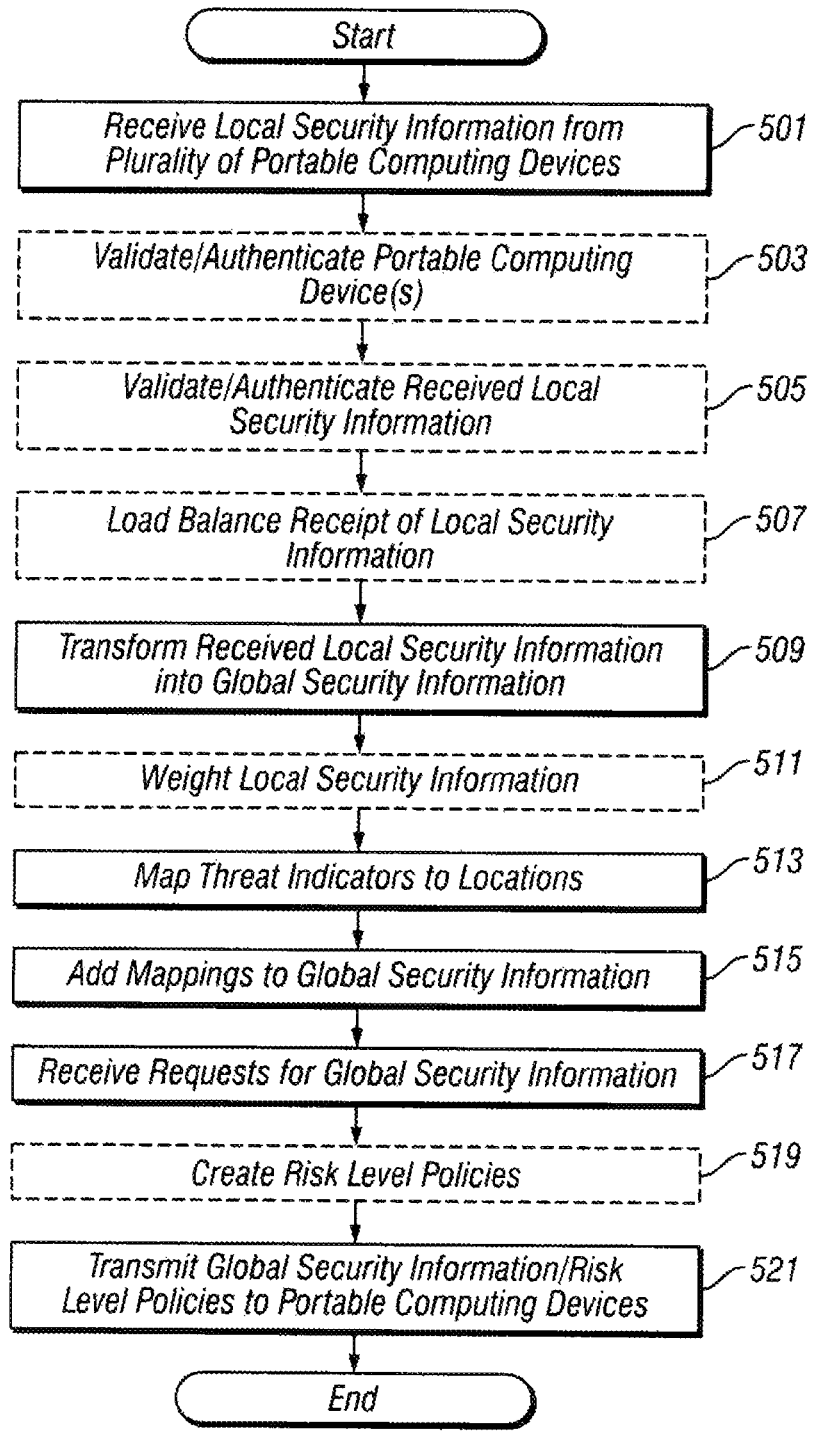
FIG. 5 is a flowchart illustrating steps for an example of generating global, location-aware security information for providing location-aware computer security to portable computing devices, according to some embodiments.

FIG. 5 illustrates steps for an example of generating global, location-aware security information 304 (FIG. 3) to provide location-aware computer security to portable computing devices 300 (FIG. 3). As illustrated in FIG. 5, a central data collection module 305 (FIG. 3) of the global, location-aware security system 101 (FIG. 1) receives 501 local, location-aware security information 303 (FIG. 3) from a large number of portable computing devices 300 (FIG. 3). The local, location-aware security information 303 (FIG. 3) from each portable computing device 300 (FIG. 3) comprises information concerning detected threat indicators, and the locations of the portable computing devices 300 (FIG. 3) at the times of detection. In some embodiments, the central data collection module 305 (FIG. 3) validates and/or authenticates 503 some or all portable computing devices from which local, location-aware security information 303 (FIG. 3) originates. The central data collection module 305 (FIG. 3) can also optionally validate and/or authenticate 505 received local, location-aware security information 303 (FIG. 3). The central data collection module 305 (FIG. 3) can also load balance 507 the receipt of local, location-aware security information 303 (FIG. 3) as it is transmitted by the plurality of portable computing devices 300 (FIG. 3).

The central data collection module 305 (FIG. 3) transforms 509 the received local, location-aware security information 303 (FIG. 3) from the plurality of portable computing devices 300 (FIG. 3) into a data set 311 (FIG. 3) of global, location-aware security information 304 (FIG. 3). In some embodiments, this transformation further comprises weighting 511 local, location-aware security information 304 (FIG. 3) originating from different portable computing devices 300 (FIG. 3).

A mapping module 321 (FIG. 3) of the global, location-aware security system 101 (FIG. 1) uses the global data set 311 (FIG. 3) to map 513 threat indicators in the global, location-aware security information to specific locations. The mapping module 321 (FIG. 3) adds 515 the resulting threat indicator mappings to the global, location-aware security information 304 (FIG. 3).

The global, location-aware security system 101 (FIG. 1) receives 517 requests 323 (FIG. 3) from portable computing devices 300 (FIG. 3) for global, location-aware security information 304 (FIG. 3) concerning their current locations. The global, location-aware security system 101 (FIG. 1) responds to receiving such a request 323 (FIG. 3) by transmitting 521 global, location-aware security information 304 (FIG. 3) concerning the specific location to the portable computing device 300 (FIG. 3), such that the portable computing device 300 (FIG. 3) can apply an appropriate location-based risk level policy 309 (FIG. 3). In some embodiments, this step comprises transmitting 521 raw, global location-aware security information 304 (FIG. 3) to the portable security device 300 (FIG. 3). In other embodiments, a policy creating module 307 of the global, location-aware security system 101 (FIG. 1) first creates 519 a location-based risk level policy 309 (FIG. 3) for the location. In these embodiments, the global, location-aware security system 101 (FIG. 1) transmits 521 this created, location-based risk level policy 309 (FIG. 3) to the portable computing device 300 (FIG. 3).

As will be understood by those familiar with the art, the claimed subject matter may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the claimed subject matter or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer implemented method for using global, location-aware security information to provide location-aware computer security to a portable computing device, the method comprising the steps of:

monitoring, by a computer, activity occurring on the portable computing device, further comprising omitting the monitoring of at least some private activity occurring on the portable computing device based on a privacy filter and omitting the monitoring of at least some activity occurring on the portable computing device based on a current location of the portable computing device;

detecting, by a computer, at least one threat indicator concerning the portable computing device based on the monitoring;

determining, by a computer, current location information concerning the portable computing device at a time of detection of a threat indicator concerning the portable computing device;

building, by a computer, local, location-aware security information, the local, location-aware security information comprising at least information concerning the at least one detected threat indicator and current location information concerning the portable computing device at a time of detection of the at least one threat indicator;

transmitting, by a computer, local, location-aware security information from the portable computing device to a global, location aware security system;

determining, by a computer, current location information concerning the portable computing device indicating that the portable computing device is physically located at a location;

transmitting, by a computer, a request for global, location-aware security information concerning the location to the global, location aware security system;

receiving, by the portable computing device, global, location-aware security information concerning the location from the global, location aware security system; and using, by a computer, the received global, location-aware security information concerning the location to provide location-aware computer security to the portable computing device while the portable computing device is physically located at the location.

2. The method of claim 1 further comprising:

determining, by a computer, current location information concerning the portable computing device indicating that the portable computing device has moved from a first location to a second location;

transmitting, by a computer, a request for global, location-aware security information concerning the second location to the global, location aware security system;

receiving, by the portable computing device, global, location-aware security information concerning the second location from the global, location aware security system; and using, by a computer, the received global, location-aware security information concerning the second location to provide location-aware computer security to the portable computing device while the portable computing device is physically located at the second location.

3. The method of claim 1 further comprising:

classifying, by a computer, the at least one detected threat indicator concerning the portable computing device; and wherein the local, location-aware security information further comprises at least information concerning the at least one detected threat indicator, a classification of the at least one threat indicator, and current location information concerning the portable computing device at a time of detection of the at least one threat indicator.

4. The method of claim 1 further comprising:

rating, by a computer, the at least one detected threat indicator concerning the portable computing device; and wherein the local, location-aware security information further comprises at least information concerning the at least one detected threat indicator, a rating of the at least one threat indicator, and current location information concerning the portable computing device at a time of detection of the at least one threat indicator.

5. The method of claim 1 wherein monitoring, by a computer, activity occurring on the portable computing device further comprises performing at least one step from a group of steps consisting of:

monitoring, by a computer, network traffic to and from the portable computing device;

monitoring, by a computer, connections on the portable computing device; and monitoring, by a computer, user activity on the portable computing device.

6. The method of claim 1 wherein transmitting, by a computer, local, location-aware security information from the portable computing device to a global, location aware security system, further comprises performing at least one step from a group of steps consisting of:

transmitting, by a computer, local, location-aware security information from the portable computing device to a global, location aware security system in real-time, as threat indicators concerning the portable computing device are detected; and transmitting, by a computer, local, location-aware security information from the portable computing device to a global, location aware security system at periodic time intervals.

7. The method of claim 1 wherein:

receiving, by the portable computing device, global, location-aware security information concerning the location from the global, location aware security system, further comprises receiving, by a computer, a location-based risk level policy for the location; and using, by a computer, the received global, location-aware security information concerning the location to provide location-aware computer security to the portable computing device while the portable computing device is physically located at the location further comprises applying, by a computer, the received location-based risk level policy for the location to the portable computing device while the portable computing device is physically located at the location.

8. The method of claim 1 wherein:

using, by a computer, the received global, location-aware security information concerning the location to provide location-aware computer security to the portable computing device while the portable computing device is physically located at the location further comprises 1) creating, by a computer, a location-based risk level policy for the location based on the received global location-aware security information concerning the location, and 2) applying the created location-based risk level policy for the location to the portable computing device while the portable computing device is physically located at the location.

9. A computer implemented method for generating global, location-aware security information to provide location-aware computer security to portable computing devices, the method comprising the steps of:

receiving, by a computer, local, location-aware security information from a plurality of portable computing devices, the local, location-aware security information from each portable computing device of the plurality comprising at least information concerning at least one detected threat indicator concerning that portable computing device, and current location information concerning that portable computing device at a time of detection of the at least one threat indicator, wherein the location-aware security information is based on monitoring activity occurring on each portable computing device of the plurality, the monitoring further comprising omitting the monitoring of at least some private activity occurring on at least one portable computing device of the plurality based on a privacy filter and omitting the monitoring of at least some activity occurring on the at least one portable computing device based on a current location of the at least one portable computing device;

transforming, by a computer, the received local, location-aware security information from the plurality of portable computing devices into global, location-aware security information;

mapping, by a computer, threat indicators in the global, location-aware security information to specific locations;

adding, by a computer, the mapping of threat indicators to specific locations to the global, location-aware security information;

receiving, by a computer, a request for global, location-aware security information concerning a specific location from a specific portable computing device; and transmitting, by a computer, global, location-aware security information concerning the specific location to the specific portable computing device in order to provide location-aware computer security to the specific portable computing device while the specific portable computing device is physically located at the specific location.

10. The method of claim 9 wherein:

transmitting, by a computer, global, location-aware security information concerning the specific location to the specific portable computing device further comprises 1) creating, by a computer, a location-based risk level policy for the specific location based on the global, location-aware security information concerning the specific location and 2) transmitting the created location-based risk level policy for the specific location to the specific portable computing device.

11. The method of claim 9 wherein transforming, by a computer, the received local, location-aware security information from the plurality of portable computing devices into global, location-aware security information further comprises:

weighting, by a computer, local, location-aware security information originating from at least one portable computing device.

12. The method of claim 9 wherein receiving, by a computer, local, location-aware security information from a plurality of portable computing devices further comprises performing at least one step from a group of steps consisting of:
  validating, by a computer, at least one portable computing device from which local, location-aware security information originates;
  validating, by a computer, at least some received local, location-aware security information;
  authenticating, by a computer, at least one portable computing device from which local, location-aware security information originates;
  authenticating, by a computer, at least some received local, location-aware security information;
  load balancing, by a computer, receipt of local, location-aware security information from the plurality of portable computing devices; and
  weighting, by a computer, received local, location-aware security information based on a reputation of the portable computing device.

13. At least one non-transitory computer readable storage medium storing a computer program product for using global, location-aware security information to provide location-aware computer security to a portable computing device, the at least one non-transitory computer readable storage medium comprising:
  program code for monitoring activity occurring on the portable computing device, further comprising omitting the monitoring of at least some private activity occurring on the portable computing device based on a privacy filter and omitting the monitoring of at least some activity occurring on the portable computing device based on a current location of the portable computing device;
  program code for detecting at least one threat indicator concerning the portable computing device based on the monitoring;
  program code for determining current location information concerning the portable computing device at a time of detection of a threat indicator concerning the portable computing device;
  program code for building local, location-aware security information, the local, location-aware security information comprising at least information concerning the at least one detected threat indicator and current location information concerning the portable computing device at a time of detection of the at least one threat indicator;
  program code for transmitting local, location-aware security information from the portable computing device to a global, location aware security system;
  program code for determining current location information concerning the portable computing device indicating that the portable computing device is physically located at a location;
  program code for transmitting a request for global, location-aware security information concerning the location to the global, location aware security system;
  program code for receiving, by the portable computing device, global, location-aware security information concerning the location from the global, location aware security system; and
  program code for using the received global, location-aware security information concerning the location to provide location-aware computer security to the portable computing device while the portable computing device is physically located at the location.

14. The at least one non-transitory computer readable storage medium of claim 13 further comprising:
  program code for determining current location information concerning the portable computing device indicating that the portable computing device has moved from a first location to a second location;
  program code for transmitting a request for global, location-aware security information concerning the second location to the global, location aware security system;
  program code for receiving, by the portable computing device, global, location-aware security information concerning the second location from the global, location aware security system; and
  program code for using the received global, location-aware security information concerning the second location to provide location-aware computer security to the portable computing device while the portable computing device is physically located at the second location.

15. The at least one non-transitory computer readable storage medium of claim 13 further comprising:
  program code for classifying the at least one detected threat indicator concerning the portable computing device; and
  wherein the local, location-aware security information further comprises at least information concerning the at least one detected threat indicator, a classification of the at least one threat indicator, and current location information concerning the portable computing device at a time of detection of the at least one threat indicator.

16. The at least one non-transitory computer readable storage medium of claim 13 further comprising:
  program code for rating the at least one detected threat indicator concerning the portable computing device; and
  wherein the local, location-aware security information further comprises at least information concerning the at least one detected threat indicator, a rating of the at least one threat indicator, and current location information concerning the portable computing device at a time of detection of the at least one threat indicator.

17. The at least one non-transitory computer readable storage medium of claim 13 wherein:
  the program code for receiving, by the portable computing device, global, location-aware security information concerning the location from the global, location aware security system, further comprises program code for receiving a location-based risk level policy for the location; and
  the program code for using the received global, location-aware security information concerning the location to provide location-aware computer security to the portable computing device while the portable computing device is physically located at the location further comprises program code for applying the received location-based risk level policy for the location to the portable computing device while the portable computing device is physically located at the location.

18. The at least one non-transitory computer readable storage medium of claim 13 wherein:
  the program code for using the received global, location-aware security information concerning the location to provide location-aware computer security to the portable computing device while the portable computing device is physically located at the location further comprises program code for 1) creating a location-based risk level policy for the location based on the received global location-aware security information concerning the location, and 2) applying the created location-based risk level policy for the location to the portable computing device while the portable computing device is physically located at the location.

19. The at least one non-transitory computer readable storage medium of claim 13 further comprising:

program code for receiving local, location-aware security information from a plurality of portable computing devices, the local, location-aware security information from each portable computing device of the plurality comprising at least information concerning at least one detected threat indicator concerning that portable computing device, and current location information concerning that portable computing device at a time of detection of the at least one threat indicator;

program code for transforming the received local, location-aware security information from the plurality of portable computing devices into global, location-aware security information;

program code for mapping threat indicators in the global, location-aware security information to specific locations;

program code for adding the mapping of threat indicators to specific locations to the global, location-aware security information;

program code for receiving a request for global, location-aware security information concerning a specific location from a specific portable computing device; and program code for transmitting global, location-aware security information concerning the specific location to the specific portable computing device.

* * * * *